(12) United States Patent
Bijloo (10) Patent No.: US 11,422,023 B2
(45) Date of Patent: Aug. 23, 2022

(54) LOAD DETERMINATION DEVICE AND CORRESPONDING MANUFACTURING METHOD

(71) Applicant: KONINKLIJKE PHILIPS N.V., Eindhoven (NL)

(72) Inventor: Michiel Dirk Augustinus Bijloo, Udenhout (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 389 days.

(21) Appl. No.: 16/636,351

(22) PCT Filed: Jul. 30, 2018

(86) PCT No.: PCT/EP2018/070534
§ 371 (c)(1),
(2) Date: Feb. 4, 2020

(87) PCT Pub. No.: WO2019/030029
PCT Pub. Date: Feb. 14, 2019

(65) Prior Publication Data
US 2020/0166402 A1 May 28, 2020

(30) Foreign Application Priority Data

Aug. 9, 2017 (EP) ..................................... 17185515

(51) Int. Cl.
*F16M 11/00* (2006.01)
*G01G 21/28* (2006.01)
*A61J 9/06* (2006.01)

(52) U.S. Cl.
CPC ............ *G01G 21/28* (2013.01); *A61J 9/0684* (2015.05); *A61J 2200/74* (2013.01)

(58) Field of Classification Search
CPC ................................. G01G 21/28; A61J 9/0684
See application file for complete search history.

(56) References Cited

U.S. PATENT DOCUMENTS 3,196,676 A * 7/1965 Pien ..................... G01L 1/2237
  73/862.632
4,619,147 A   10/1986 Yoshimura
(Continued)

FOREIGN PATENT DOCUMENTS

CA      174700      5/2018
CN     104776900    7/2015
(Continued)

OTHER PUBLICATIONS

International Search Report and Written Opinion dated Oct. 16, 2018 for International Application No. PCT/EP2018/070534 Filed Jul. 30, 2018.

*Primary Examiner* — Amy J. Sterling (57) ABSTRACT

A load determination device (1) is provided, comprising a load cell component (10), a hull component (20) of which the load is to be determined, the hull component (20) being provided in contact with the load cell component (10), a base component (30) for supporting the load cell component (10) on a surface, a sealing component (50) for sealing the load cell component (10) within the load determination device (1) being arranged in sealing connection between the hull component (20) and the base component (30), wherein the sealing component (50) comprises a bellows portion (52) surrounding the base component (30), wherein the bellows portion (52) comprises a rotational symmetric rolling (58) directed away from the surface. The load determination device (1) and a corresponding method for manufacturing such load determination device (1) provide an improved sealing of the load cell component (10).

15 Claims, 3 Drawing Sheets

(56) References Cited

U.S. PATENT DOCUMENTS

| | | | |
|---|---|---|---|
| 5,319,161 A * | 6/1994 | Miller | G01G 23/005 |
| | | | 177/154 |
| 6,789,435 B2 | 9/2004 | Hopkins | |
| 9,164,004 B2 * | 10/2015 | Schmittner | G01G 3/12 |
| 9,255,832 B2 * | 2/2016 | Schmittner | G01G 3/12 |
| D844,158 S | 3/2019 | Sandberg | |
| 2015/0226601 A1 * | 8/2015 | Perrea | G01G 23/005 |
| | | | 177/145 |

FOREIGN PATENT DOCUMENTS

| | | |
|---|---|---|
| DE | 20018255 U1 | 2/2001 |
| GB | 2513136 | 10/2014 |
| JP | 2003329509 | 11/2003 |
| JP | 2006071391 | 3/2006 |

* cited by examiner

LOAD DETERMINATION DEVICE AND CORRESPONDING MANUFACTURING METHOD

CROSS REFERENCE TO RELATED APPLICATIONS

This application is the U.S. National Phase application under 35 U.S.C. § 371 of International Application No. PCT/EP2018/070534 filed Jul. 30, 2018, published as WO 2019/030029 on Feb. 14, 2019, which claims the benefit of European Patent Application Number 17185515.8 filed Aug. 9, 2017. These applications are hereby incorporated by reference herein.

FIELD OF THE INVENTION

The present invention relates to a load determination device and a corresponding method for manufacturing such load determination device.

The invention finds particular applications in household devices including smart feeding bottles and smart bottle sleeves with weighing function, while the present invention is not limited to these applications and can be applied in other fields, including watertight load cell applications and air or gas pressure sensors.

BACKGROUND OF THE INVENTION

The use of load cells for determining weight is known in different applications. For instance, as disclosed in U.S. Pat. No. 6,789,435, load cells for so-called single point applications are known, in which a single load cell is provided to weigh an entire load, for example, the entire load of a weighting platform.

While various reasons and examples for protecting and sealing strain gages of such load cells are known from U.S. Pat. No. 6,789,435, these solutions are not suitable for, for instance, household products including feeding bottles having a load cell integrated therein. Such devices, having the entire load cell component integrated into the device, require not only the strain gages but preferably the entire load cell component to be sealed. However, such seal must not receive gravitational forces from the load to be determined, which should solely pass through the load cell component instead.

For the particular example of household products, it is further preferred that the product be at least IPX4 proof, i.e. washable under tap water or resistant to splashing water independent from the direction. Further, in terms of hygiene, it is preferred for the product not to contain small uncleanable gaps.

GB 2 513 136 A discloses scales comprising at least one transducer, a weighing pan arranged such that weight applied to the weighing pan is referred to the transducer, and electronics which receive an output from the transducer and drive a display to provide a user with a visible indication of the weight applied to the weighing pan, wherein the transducer and electronics are contained in a sealed enclosure defined at least in part by a flexible water-tight membrane which is able to move and thereby (a) to accommodate changes of volume of the sealed enclosure without creating a pressure differential between the interior and the exterior of the sealed enclosure and (b) to accommodate movement of the weighing pan.

JP 2006 071391 A provides an electrical balance of a waterproof construction capable of preventing a measured value from being influenced by a change in instrument inside pressure resulting from a change in load and a change in temperature, a change in outside air pressure, etc., at measurement. An instrument inside a pressure adjusting diaphragm is provided for adjusting the change in the instrument inside pressure resulting from the change in load, the change in temperature, and a change in air pressure at measurement.

JP 2003 329509 A discloses scales with a movable stopper forming a valve to open and close an opening in the scales' casing, the stopper being actuated by a supporting leg. The intention is to open the casing and so equalize pressure and humidity of the trapped air when the scales are placed on a supporting surface ready for use. Lifting the scales form the supporting surface causes the casing to be sealed.

SUMMARY OF THE INVENTION

It has thus been an object of the present invention to provide a load determination device including a load cell component and a corresponding method for manufacturing such load determination device, which provides an improved sealing of the load cell component.

In a first aspect, a load determination device is provided, wherein the load determination device comprises a load cell component comprising a load receiving portion, a fixed portion and a load determination portion, wherein the load determination portion is arranged between the load receiving portion and the fixed portion, a hull component of which the load is to be determined, the hull component being provided in contact with the load receiving portion, a base component for supporting the load cell component on a surface, the base component being provided in contact with the fixed portion, a sealing component for sealing the load cell component within the load determination device, wherein the sealing component is arranged in sealing connection between the hull component and the base component, wherein the sealing component comprises a bellows portion surrounding the base component, wherein the bellows portion comprises a rotational symmetric rolling directed away from the surface.

The hull component, which is in contact with and preferably supported by the load receiving portion of the load cell component, preferentially defines the weight or load detected by the load cell component. Since the fixed portion is in contact with and supported by the base component, the load cell component is preferentially configured to determine the weight of the hull component relative to the base component. In order for the load cell component to accurately determine the load and/or weight of the hull component, it is preferred that all gravitational force of the hull component pass through the load cell component and no other component of the load determination device. The load determination device according to the invention preferentially thus allows for a self-contained determination of the weight of and loads acting on the hull component, respectively.

The solution according to the invention allows for a sealing component to be arranged between the hull component and the base component, wherein the sealing component allows for the load cell component to be sealed within the load determination device, wherein no gravitational forces of the hull component travel to the base component via the sealing component, but only through the load cell component instead. This is achieved by the inventive arrangement of the sealing component comprising a bellows portion having a rotational symmetric rolling.

The bellows portion comprising a rotational symmetric rolling allows for a decoupling of both vertical and horizontal forces acting on the hull component, for instance through gravity, from the base component by the sealing component, even though the elements are connected by the sealing component. The loads acting on one side of the sealing element, e.g. the hull component, are thus decoupled through the sealing component from the reference for load determination by the load cell component, i.e. from the base component. Expressed differently, all loads acting on the hull component, both horizontal and vertical, are not transmitted via the sealing component to the base component, but travel through the load cell component from the load receiving portion via the load determination portion to the fixed portion and into the base component.

Since the bellows portion comprises the rotational symmetric rolling, loads acting on the rolling are equally distributed and no load peaks, which would cause a load transmission due to reduced elasticity, occur at any rotational position.

Finally, since the bellows portion comprises the symmetric rolling being directed away from the surface, the rotational symmetric rolling is not in contact with the surface and will not transfer forces to the surface when the load determination device is supported on the surface. Expressed differently, all gravitational loads of the load determination device preferably pass through the base component to the surface and are not transmitted via the rotational symmetric rolling.

The base component can in one example be directly supported on the surface, i.e. be in direct contact with the surface, and thus directly support the load cell component on the surface. However, the load cell component can of course also be indirectly supported on the surface by the base component, which means a further element can be arranged between the base component and the surface. The further element can for instance be a part of the sealing component in case it covers the base component on its outside, i.e. the side to be in contact with the surface.

Preferably, the sealing component is arranged to completely cover the base component on the face to be in contact with the surface. Thus, in this embodiment, the load determination device is configured to reside on the surface with the base component covered by a part of the sealing component. In other embodiments, the sealing component can of course be arranged in a different sealing connection with the base component, for instance with a different portion thereof, as long as the sealing component inhibits liquids and/or gas from reaching the load cell component. Further preferentially, the load cell component is arranged within a closed space surrounded by the hull component, the base component and the sealing component.

The hull component preferentially comprises a matter reception component for receiving matter therein, such as a container or the like of a feeding bottle in one example. The load cell component can then determine the load of the hull component including any matter received within the matter reception component. In other embodiments, the hull component comprises a force reception component for receiving, for instance, forces from air or gas pressure thereon. Various other embodiments of the hull component are contemplated, wherein the hull component is not limited but through the suitability that its weight or loads acting thereon can be determined by the load cell component.

Preferentially, the load cell component comprises a beam type load cell arrangement as known in the art. However, in other embodiments also other known cell components are contemplated.

Preferentially, the rotational symmetric rolling radially extends from the base component outwards. Preferably, the bellows portion comprises a single rolling, so that no small gaps or edges occur, as would be the case with, for instance, are harmonica or trampoline type flexible sealing concepts. However, it should be understood that also more than one rotational symmetric rolling is contemplated in other embodiments. Advantageously, the load cell determination device according to the present invention thus not contains small and uncleanable gaps.

Further, since the load cell component is sealed within the load determination device, the entire load determination device preferably can be subjected to water, such as for cleaning purposes.

In an embodiment of the load determination device, the rotational symmetric rolling comprises a vertical rolling.

Without loss of generality, the vertical direction is understood in the context of this application as direction normal to the base component, i.e. the direction in which gravitational forces act in case the load determination device is arranged on a horizontal surface. The vertical rolling according to this preferred embodiment thus extends substantially normal to the horizontal surface in the vertical direction. Expressed even differently, the rotational symmetric rolling thus extends inwardly curved into the load determination device with respect to the base component, more precisely extends inwardly into the load determination device surrounding the base component.

The vertical rolling achieves a particularly favorable decoupling of horizontal forces acting on the hull component from the base component and thus minimizes an influence on the load determination by the load cell component.

In an embodiment of the load determination device, the vertical rolling comprises an inner side wall and an outer side wall, wherein a lower end of the outer side wall is configured to be vertically elevated with respect to the surface.

Since the lower end of the outer side wall is vertically elevated with respect to the surface, the outer side and thus the portion of the sealing component closer to the hull component is not in contact with the surface and can thus not insert gravitational forces from the hull component into the surface. Expressed differently, the outer side wall is vertically decoupled from the inner side wall through the vertical rolling arranged in between and does not couple vertical or gravitational loads from the hull component, preferentially including the matter reception component, to the base component via the rotational symmetric rolling.

In an embodiment of the load determination device, the load cell component is arranged substantially horizontally, wherein the load determination portion is arranged in line with and in between the load receiving portion and the fixed portion.

The preferred arrangement of the various portions of the load cell component is in line with known examples of beam type load cells. However, in other embodiments, also different types of load cells are of course contemplated.

In an embodiment of the load determination device, the base component comprises a circular plate, wherein the rotational symmetric rolling surrounds the circular plate.

The circular plate allows for the rotational symmetric rolling to provide a favorable distribution of loads over the entire horizontal plane. However, in other embodiments, also different shapes, such as polygonal or ellipsoid shapes of the base component are of course contemplated.

In an embodiment of the load determination device, the bellows portion is provided horizontally directly adjacent to the base component.

Since the bellows portion is provided horizontally directly adjacent to the base component, the space between base component and hull component is optimally used. Since preferably only a single rolling is provided in the space there between, the size of the gap induced by the rolling is maximized and thus most favorable for cleaning, since no small gaps or edges occur.

In an embodiment of the load determination device, the load determination device is a household product. Particularly for household products both clean ability and waterproofness are important. Nevertheless, in other embodiments also other devices, including watertight weight/force load cell applications or air/gas pressure sensors are contemplated.

In an embodiment of the load determination device, the household product is a feeding bottle. Particularly in connection with feeding infants, in particular related to breastfeeding, it is important to precisely determine an amount of breast milk consumed by the infant in order to protect the health of the infant. However, the load determination device can also be any other suitable household product, for instance.

In an embodiment of the load determination device, the hull component comprises a matter reception component including a container for receiving a liquid therein.

The weight of the liquid received in the container is thus advantageously determined by the load cell component. For instance, the hull component comprises a matter reception component including a container in case the load determination device is formed as feeding bottle or a different household product. However, in the embodiments, the hull component can comprise other elements for receiving matter and/or forces acting thereon. For example, as briefly indicated above, the hull component can be formed so as to sense a pressure of air or gases in the surrounding.

In an embodiment of the load determination device, the matter reception component comprises a first material, in particular a first plastic material, wherein the first material has a higher stiffness than the sealing component.

In a preferred case, the matter reception component comprises a first material which is stiff enough to transmit all gravitational forces and/or loads acting on the matter reception component to the load cell component alone. Since the first material is provided with a higher stiffness than the sealing component, it is thus possible to decouple loads acting on the matter reception component from the base component, since they are not transmitted through the sealing component showing a lower stiffness.

In an embodiment of the load determination device, the sealing component comprises a second material, in particular a second plastic material, wherein the second material has a lower stiffness than at least one of the hull component and the base component.

In a preferred case, both the hull component, and the base component experience higher stiffness than the second material which forms the sealing component, so that the relative low stiffness allows for an optimal decoupling of forces between the two stiffer elements.

In an embodiment of the load determination device, the second material comprises a soft rubber type material. However, in other embodiments, also other low stiffness and preferably high elasticity materials are of course contemplated.

In an embodiment of the load determination device, the sealing component is attached to components having a higher stiffness than the sealing component in a portion different from the bellows portion only.

Since the sealing component is thus not attached to other components having a higher stiffness in the bellows portion, the advantageous decoupling achieved through the bellows portion is not impeded through contact with higher stiffness components in that region. Particularly and preferably, the load cell component's full sensitivity is obtained in the ideal case of a rigid connection of the load receiving portion with the hull component, e.g. the matter reception component thereof, a rigid connection of the fixed portion to the base component and an extremely thin sealing component and bellows portion made out of a very soft material, i.e. a material having a very low stiffness.

In an embodiment of the load determination device, at least part of the hull component and the sealing component are manufactured in a 2K injection molding process.

The 2K injection molding process allows for a safe connection between both injected materials, while at the same time maintaining a relatively easy and well-understood manufacturing process. Yet, this is only one example of a suitable manufacturing process for manufacturing a load determination device according to the invention, while other manufacturing processes are contemplated.

In a further aspect, a method of manufacturing a load determination device according to an embodiment of the present invention is provided. The method comprises molding at least part of the hull component using a first material, and overmolding the hull component with the sealing component using a second material in a 2K injection molding process.

It shall be understood that the system of claim 1 and the method of claim 15 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
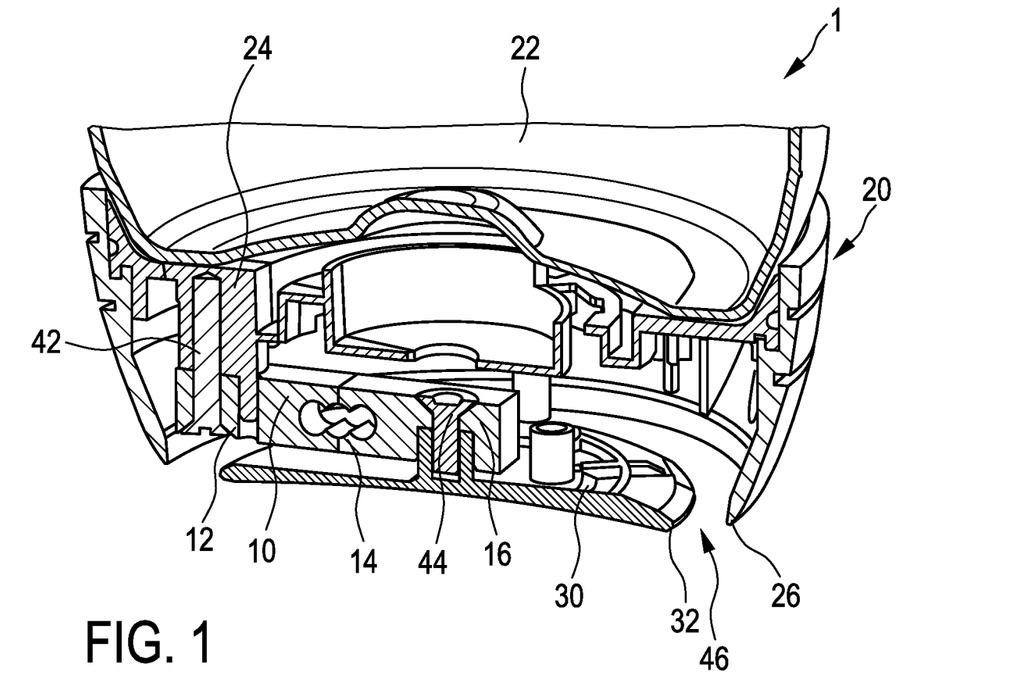
FIG. 1 shows schematically and exemplarily a load determination device without a sealing component in cross section.

FIG. 1 shows schematically and exemplarily a perspective cross-sectional view through a load determination device 1 for illustrating the concept of load cells.

Load determination device 1 as shown in FIG. 1 comprises a load cell component 10, a hull component 20 and a base component 30. Load cell component 10 comprises a load receiving portion 12, a load determination portion 14 and fixed portion 16. Load determination portion 14 is arranged in between load receiving portion 12 and fixed portion 16 and is configured to determine loads acting on load receiving portion 12.

In this example, load determination device 1 is formed as a bottle, and thus hull component 20 comprises a matter reception component 22 formed as a container for receiving liquid, and housing parts 24 housing the connection between hull component 20 and load cell component 10. In this example, hull component 20 can be formed of a single plastic material having a certain stiffness, while in other examples, also multiple elements or parts can be assembled to form hull component 20, wherein these multiple parts or elements can also comprise different materials.

Load receiving portion 12 is in contact with housing parts 24 of hull component 20 and attached thereto by means of a bolt 42 in this example. It should be noted that there is a connection only in a single point between hull component 20 and load cell component 10, which is realized at load receiving portion 12, in this example by means of bolt 42. Thus, all gravitational forces of hull component 20 including possible liquids received within matter reception component 22 will go through load receiving portion 12 of load cell component 10.

On the other side of load cell component 10, fixed portion 16 is connected to base component 30, in this example also by means of a bolt 44. Base component 30 comprises, in this example, a substantially circular base plate, on which the entire weight of load determination device 1 is supported, when load determination device 1 is placed on a surface with base component 30.

In this example, load cell component 10 extends horizontally with load determination portion 14 arranged in between load receiving portion 12 and fixed portion 16. Load determination portion 14 comprises in this example multiple horizontal through holes, which extend substantially in the same plane of load cell component 10 and substantially perpendicular to the extension direction of load cell component 10. One or more strain gages (not shown) can be provided at load determination portion 14 to determine the loads applied to load receiving portion 12 by hull component 20. The exemplary load cell component 10 is just one example of several possible load cell variations, wherein other beam type load cells or different load cells as known to the skilled person can be provided instead.

In load determination device 1 shown in FIG. 1, loads of hull components 20 are transmitted into the surface via base component 30 only via load cell component 10. For this purpose, a gap 46 exists between a lower end 26 of hull component 20 and an outer edge 32 of base component 30. The gap 46 is necessary so that loads (e.g. gravitational forces) of hull component 20 are not directly transmitted into base component 30 and/or the surface it is based on, i.e. by bypassing load cell component 10. However, at the same time, gap 46 leads to an unsealed, open space, in which load cell component 10, for instance, is provided. Thus, possible electronic components or otherwise sensitive components within the unsealed space into which the opening is defined by gap 46 are not protected against, for instance, incoming water and the like.

Therefore, an enclosure around the construction including load cell component 10 is needed, which should not have an impact on the force travelling through load cell component 10, which would namely give direct misread of the loads determined by load cell component 10. Further, the enclosure should preferably seal the inside from intruding water and the like and should not create any small, uncleanable gaps, which is a desired property particularly for load determination devices 10 in the form of household products. This enclosure corresponds to sealing component 50, which will be described in detail with reference to FIGS. 2 to 4 below.

Figure 2:
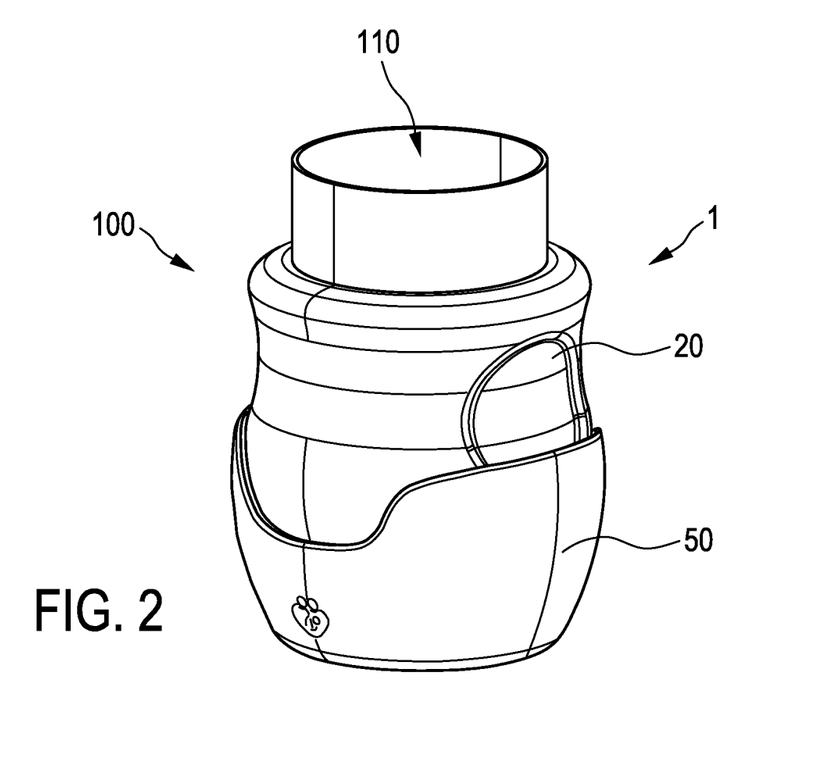
FIG. 2 shows schematically and exemplarily a perspective view of a feeding bottle as an example of a load determination device according to the present invention.

FIG. 2 shows schematically and exemplarily a feeding bottle 100 as an example of a load determination device 1 comprising hull component 20 and sealing component 50 provided about a lower portion of feeding bottle 100. In the example of feeding bottle 100, an opening 110 for inserting liquid into feeding bottle 100 is provided, of which the weight can be determined by the load cell component 10 (not visible in FIG. 2).

Figure 3:
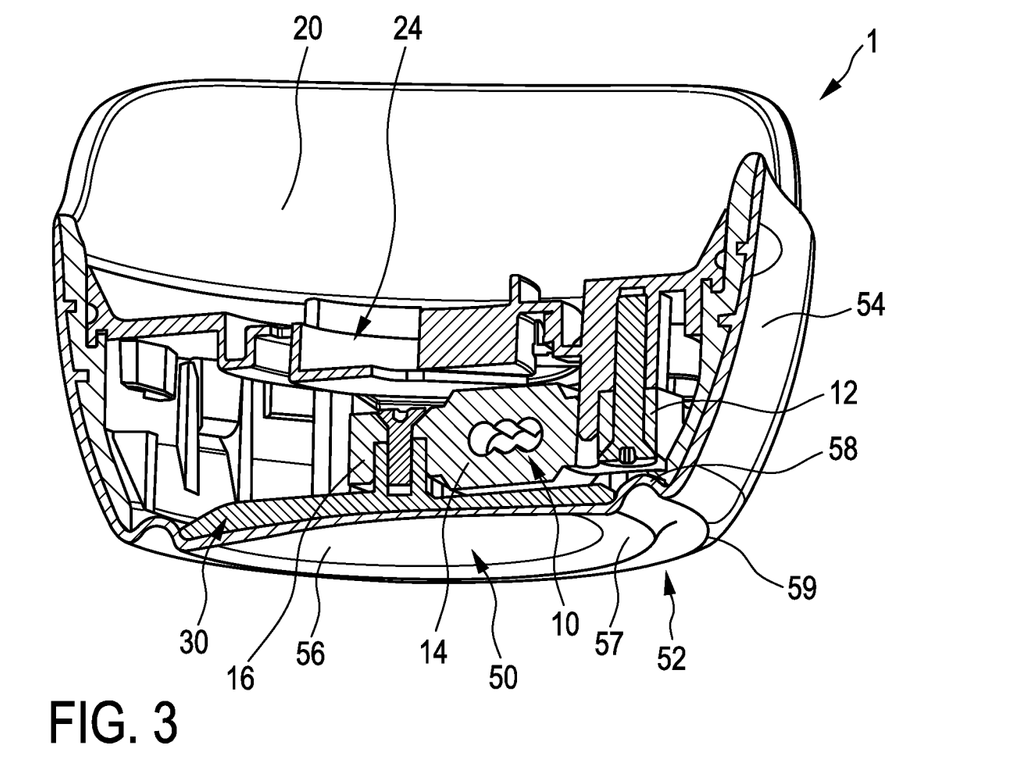
FIG. 3 shows schematically and exemplarily a load determination device according to the invention in cross section.

FIG. 3 shows schematically and exemplarily a perspective cross-sectional view of load determination device 1, e.g. the exemplary feeding bottle 100 of FIG. 2. Sealing component 50 is configured to seal load cell component 10 within load determination device 1, wherein sealing component 50 provides preferably a flexible, sealing connection between hull component 20 and base component 30. In this example, sealing component 50 comprises a hull portion 54 and a base portion 56, which are linked to each other by means of a bellows portion 52 surrounding base component 30.

In this example, base portion 56 covers base component 30 on the lower surface thereof entirely, wherein in other examples sealing component 50 is only in contact with at least part of the surface of base component 30 or even only with a different part, for instance a side surface, thereof. However, it is important that bellows portion 52 surround base component 30 and seal gap 46 as described with reference to FIG. 1.

Since sealing component 50 does not directly transmit forces to load cell component 10, load cell component 10 is maintained supported on the surface by base component 30, even when base component 30 is partly or fully covered by sealing component 50 on the surface side thereof. Expressed differently, in some examples further elements, such as parts of sealing component 50 or other elements, can be provided between base component 30 and the surface without deteriorating the load determination by load cell component 10.

To avoid an accumulation of liquid and to facilitate drying of the surface under load determination device 1, i.e. a surface load determination device 1 is supported on, one or more protruding noses can be provided on the lower surface of load determination device 1. The protruding noses can additionally reduce the risk of load determination device 1 gliding over its supporting surface, for example in case of a wet surface. For instance, three protrusions can be formed and be symmetrically arranged on the lower surface side of base component 30 or, preferably, sealing component 50 covering base component 30. Of course, the number and arrangement of the protrusions is not limited to this example.

Figure 4:
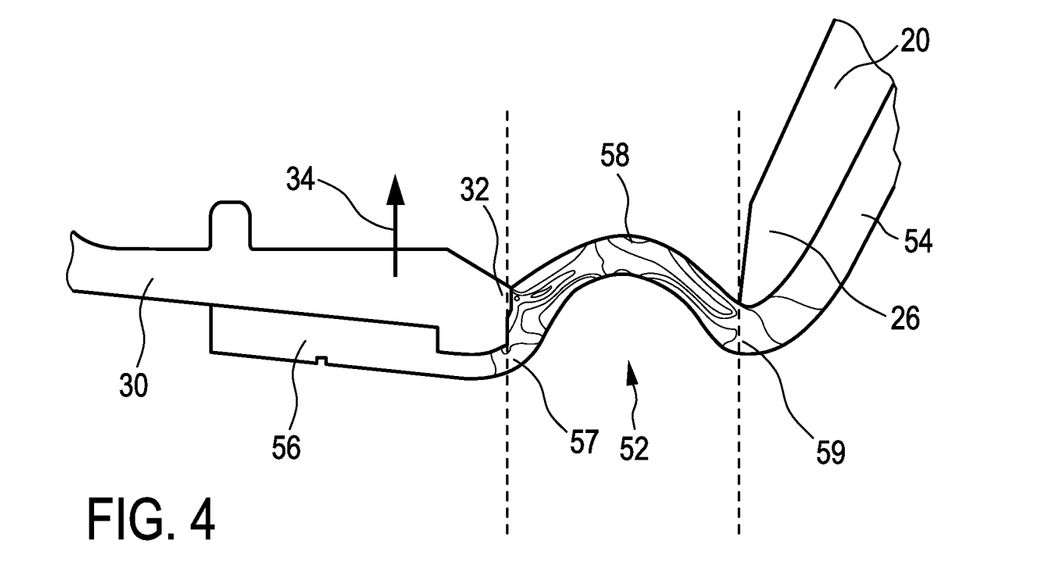
FIG. 4 shows schematically and exemplarily a cross sectional view of the sealing component of the load determination device in further detail.

Bellows portion 52 comprises in this example a single rotational symmetric rolling 58 between a lower side of an inner side wall 57 and an outer side wall 59, which is illustrated in more detail in FIG. 4.

FIG. 4 shows sealing component 50 in further detail. In this example, sealing component 50 is only provided to a certain extend over the lower surface of base component 30. An arrow 34 indicates that all gravitational loads of hull component 20 are transmitted through base component 30 and not through sealing component 50. To this end, FIG. 4 illustrates that the decoupling of loads both horizontally and vertically is achieved by sealing component 50, in particular by bellows portion 52 thereof.

Dashed lines indicate the border between hull portion 54, which is attached or fixed to hull component 20, flexible bellows portion 52, which forms the seal, and fixed base portion 56, which is attached or fixed to based component 30, respectively.

Between edge 32 of based component 30 and lower end 26 of hull component 20, an inwardly curved rolling 58 is formed in sealing component 50. Preferably, sealing component 50 is entirely formed of a low stiffness material, such as a rubber material. Thus, rolling 58 of bellows portion 52 provides very little resistance and thus transmission capabilities for loads applied to hull component 20 and thus hull portion 54 of sealing component 50 attached therewith.

In particular, vertical forces on hull component 20 just alter the curvature of rolling 58, but will not get transported to the inner side of bellows portion 52 and thus will not be transmitted to base component 30. As can be seen in FIG. 4, for instance, lower end of the outer side wall 59 is located vertically above lower end of inner side wall 57 and thus outer side wall 59 is not in contact with the surface, on which base component 30 is placed on.

Further, due to the rotational symmetric provision of bellow portion 52, also horizontal loads or forces applied to hull component 20 are not transmitted to base component 30 via sealing component 50, since the rolling 58 provides a favorably low resistance for such forces. In particular, the bellows arrangement with a single rolling 58 has proven to show less interference with load cell component 10 compared to other flexible sealing components like harmonica and trampoline archetypes. This can, for instance, be demonstrated through finite element simulations as indicated through different gradation of sealing component 50 in FIG. 4.

Further, since the entire gap between base component 30 and hull component 20 is exploited for a single rolling 58, no small gaps or edges occur, which would impulse difficulties for cleaning, so that load determination device 1 according to the invention can be clean easily.

Load cell component 10 works by sensing small deformations, which are caused by the weight of hull component 20, i.e. gravitational loads caused therefrom, when it is placed on a horizontal surface with base component 30, either directly or covered with base portion 56 of sealing component 50. Load generated by hull component 20 includes loads or weight of matter reception component 22, for instance the container including the liquid, and housing parts 24, for instance.

In order to allow the weight of hull component 20 to be carried mostly by load cell component 10, a compliant bellow-like bellows portion 52 is provided in sealing component 50, which at least partly covers hull component 20 and base component 30. Sealing component 50 is preferably made from a low stiffness material, such as rubber, which is attached to a much stiffer material, for instance of hull component 20 or base component 30, except for bellows portion 52, in which sealing component 50 is not attached to a stiffer material. As a result, deformation due to the weights is concentrated in the bellows portion 52 only and not transferred under avoidance of load cell component 10.

The strain in the preferably stiff load cell component 10 is determined by the weight and stiffness of the assembly, which would be unfavorable if the bellows portion 52 would be stiff and the area, in which the fixed portion 16 of load cell component 10 would be secured is flexible, since load cell component 10 would then feel very little of the weight. Instead, load cell component 10 would achieve the full sensitivity in the ideal case of a rigid fixation of load cell component 10 to hull component 20 and to base component 30, wherein sealing component 50 including bellows portions 52 consists of a very soft and thin material.

Figure 5:
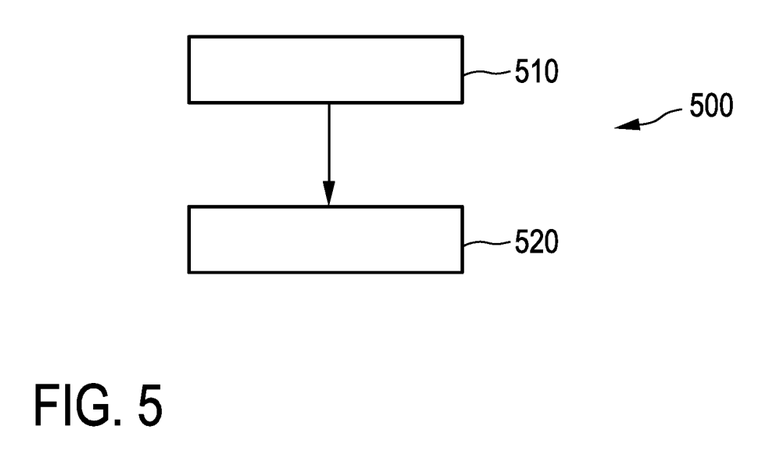
FIG. 5 shows a flowchart exemplarily illustrating an embodiment of a method of manufacturing a load determination device.

Next, FIG. 5 shows a flowchart exemplarily illustrating an embodiment of a method 500 of manufacturing a load determination device 1 according to the present invention. The method 500 comprises a step 510 of molding at least part of hull component 20 using a first material. Further, one, more or all of the elements of load cell component 10 and base component 30 can be molded in the same or consecutive stages.

In a further step 520, at least part of the hull component 20 is overmolded with the sealing component 50 using a second material in a 2K injection molding process. The 2K injection molding process allows a safe link between the first and second material, while at the same time being widely available and a well-understood process.

It should be noted that also different methods of manufacturing, such as by using other attachment means including gluing, welding and the like, could be employed for linking the sealing component 50 to the rest of load determination device 1.

While the invention has been described with reference to a particular example of feeding bottle 100 as an example of load determination device 1, its application is not limited to the use in feeding bottles 100. Other examples for employing the load determination device according to the invention are, without limitation, smart bottle sleeves with weighting functions, watertight weight and/or force cell applications and air or gas pressure sensors. The person skilled in the art is aware of additional applications of advantageously employing the concept of the present invention.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Thus, a load determination device 1 is provided, comprising a load cell component 10, a hull component 20 of which the load is to be determined, the hull component 20 being provided in contact with the load cell component 10, a base component 30 for supporting the load cell component 10 on a surface, a sealing component 50 for sealing the load cell component 10 within the load determination device 1 being arranged in sealing connection between the hull component 20 and the base component 30, wherein the sealing component 50 comprises a bellows portion 52 surrounding the base component 30, wherein the bellows portion 52 comprises a rotational symmetric rolling 58 directed away from the surface. The load determination device 1 and a corresponding method for manufacturing such load determination device 1 provide an improved sealing of the load cell component 10.

The invention claimed is:

1. A load determination device, the load determination device comprising:
    a load cell component comprising a load receiving portion, a fixed portion and a load determination portion, wherein the load determination portion is arranged between the load receiving portion and the fixed portion,
    a hull component of which the load is to be determined, the hull component being provided in contact with the load receiving portion,
    a base component for supporting the load cell component on a surface, the base component being provided in contact with the fixed portion,
    a sealing component for sealing the load cell component within the load determination device, wherein
    the sealing component is arranged in sealing connection between the hull component and the base component, wherein
    the sealing component comprises a bellows portion surrounding the base component, wherein
    the bellows portion comprises a rotational symmetric rolling directed away from the surface.

2. The load determination device according to claim 1, wherein the rotational symmetric rolling comprises a vertical rolling.

3. The load determination device according to claim 2, wherein the vertical rolling comprises an inner side wall and an outer side wall, wherein a lower end of the outer side wall is configured to be vertically elevated with respect to the surface.

4. The load determination device according to claim 1, wherein the load cell component is arranged substantially horizontally, wherein the load determination portion is arranged in line with and in between the load receiving portion and the fixed portion.

5. The load determination device according to claim 1, wherein the base component comprises a circular plate, wherein the rotational symmetric rolling surrounds the circular plate.

6. The load determination device according to claim 1, wherein the bellows portion is provided horizontally directly adjacent to the base component.

7. The load determination device according to claim 1, wherein the load determination device is a household product.

8. The load determination device according to claim 5, wherein the household product is a feeding bottle.

9. The load determination device according to claim 1, wherein the hull component comprises a matter reception component including a container for receiving a liquid therein.

10. The load determination device according to claim 1, wherein the hull component comprises a first material, in particular a first plastic material, wherein the first material has a higher stiffness than the sealing component.

11. The load determination device according to claim 1, wherein the sealing component comprises a second material, in particular a second plastic material, wherein the second material has a lower stiffness than at least one of the hull component and the base component.

12. The load determination device according to claim 1, wherein the second material comprises a soft rubber type material.

13. The load determination device according to claim 1, wherein the sealing component is attached to components having a higher stiffness than the sealing component in a portion different from the bellows portion only.

14. The load determination device according to claim 1, wherein at least part of the hull component and the sealing component are manufactured in a 2K injection molding process.

15. A method of manufacturing a load determination device according to claim 1, the method comprising:
    molding at least part of the hull component using a first material, and
    overmolding the hull component with the sealing component using a second material in a 2K injection molding process.

* * * * *